US012573887B2

(12) United States Patent
Kanagawa et al.

(10) Patent No.:  US 12,573,887 B2
(45) Date of Patent:      Mar. 10, 2026

(54) ENERGY SUPPLY DEVICE

(71) Applicant: SAMSUNG ELECTRONICS CO., LTD., Suwon-si (KR)

(72) Inventors: Tomoyuki Kanagawa, Kanagawa (JP); Masashi Sasagawa, Kanagawa (JP); Yasushi Soda, Kanagawa (JP); Seisaku Oosako, Kanagawa (JP); Yutaka Yagi, Kanagawa (JP); Nobuharu Nishikoori, Kanagawa (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 20 days.

(21) Appl. No.: 18/592,288

(22) Filed: Feb. 29, 2024

(65) Prior Publication Data

US 2024/0204574 A1      Jun. 20, 2024

Related U.S. Application Data

(63) Continuation of application No. PCT/KR2022/011911, filed on Aug. 10, 2022.

(30) Foreign Application Priority Data

Aug. 30, 2021      (JP) ................................. 2021-139749

(51) Int. Cl.
*H02J 50/60*          (2016.01)
*H02J 50/12*          (2016.01)
(Continued)

(52) U.S. Cl.
CPC .............. *H02J 50/60* (2016.02); *H02J 50/12* (2016.02); *H02J 50/402* (2020.01); *H05B 6/44* (2013.01)

(58) Field of Classification Search
CPC .......... H02J 50/60; H02J 50/12; H02J 50/402; H02J 50/80; H02J 50/40; H02J 50/90; H05B 6/44; H05B 6/02; G01R 19/12
See application file for complete search history.

(56) References Cited

U.S. PATENT DOCUMENTS 7,812,481 B2      10/2010  Iisaka et al.
9,530,558 B2      12/2016  Nakano et al.
(Continued)

FOREIGN PATENT DOCUMENTS

EP          3355083 B1      2/2021
JP          4525710 B2      8/2010
(Continued)

OTHER PUBLICATIONS

International Search Report and Written Opinion of the International Searching Authority dated Nov. 15, 2022, in connection with International Application No. PCT/KR2022/011911, 13 pages.

*Primary Examiner* — Lincoln D Donovan
*Assistant Examiner* — Alex W Law

(57)          ABSTRACT

An energy supply device that supplies energy to an object. In an embodiment, the energy supply device may include at least one processor, and a plurality of coils connected to a resonant condenser for energy supply and an inverter circuit. In an embodiment, the at least one processor may determine a first coil from among a plurality of coils as a transmission coil and determine a second coil from among the plurality of coils as a reception coil. Further, the at least one processor may transmit a detection signal to the first coil, obtain an induction signal induced in the second coil through a reception circuit connected to the second coil, and detect the object on the energy supply device based on the obtained induction signal.

20 Claims, 11 Drawing Sheets

(51) Int. Cl.
  H02J 50/40 (2016.01)
  H05B 6/44 (2006.01)

(56) References Cited

U.S. PATENT DOCUMENTS

| | | | |
|---|---|---|---|
| 10,274,631 B2 | 4/2019 | Yamamoto et al. | |
| 10,651,658 B2 | 5/2020 | Yamamoto et al. | |
| 10,856,368 B2 | 12/2020 | Yoshino et al. | |
| 11,056,926 B2 | 7/2021 | Choi et al. | |
| 11,063,635 B2 | 7/2021 | Kozakai et al. | |
| 11,289,951 B2 | 3/2022 | Ha et al. | |
| 11,424,647 B2 | 8/2022 | Van Wageningen et al. | |
| 11,605,985 B2 | 3/2023 | Russell et al. | |
| 11,831,178 B2 | 11/2023 | Schwartz et al. | |
| 2020/0266671 A1* | 8/2020 | Choi | H02J 50/60 |
| 2021/0298136 A1 | 9/2021 | Moon et al. | |
| 2024/0035858 A1* | 2/2024 | Yu | G01D 5/20 |

FOREIGN PATENT DOCUMENTS

| | | | |
|---|---|---|---|
| JP | 6617213 B2 | 12/2019 | |
| JP | 6741985 B2 | 8/2020 | |
| JP | 7145888 B2 | 10/2022 | |
| KR | 20180085476 A | 7/2018 | |
| KR | 20190020167 A | 2/2019 | |
| KR | 101965205 B1 | 4/2019 | |
| KR | 20200099916 A | 8/2020 | |
| KR | 20200101035 A | 8/2020 | |
| KR | 20210109249 A | 9/2021 | |
| KR | 102506325 B1 | 3/2023 | |
| KR | 20230098367 A | 7/2023 | |
| WO | 2009081115 A1 | 7/2009 | |
| WO | 2017064803 A1 | 4/2017 | |
| WO | 2021115913 A1 | 6/2021 | |
| WO | 2021122427 A1 | 6/2021 | |

* cited by examiner

FIG. 5

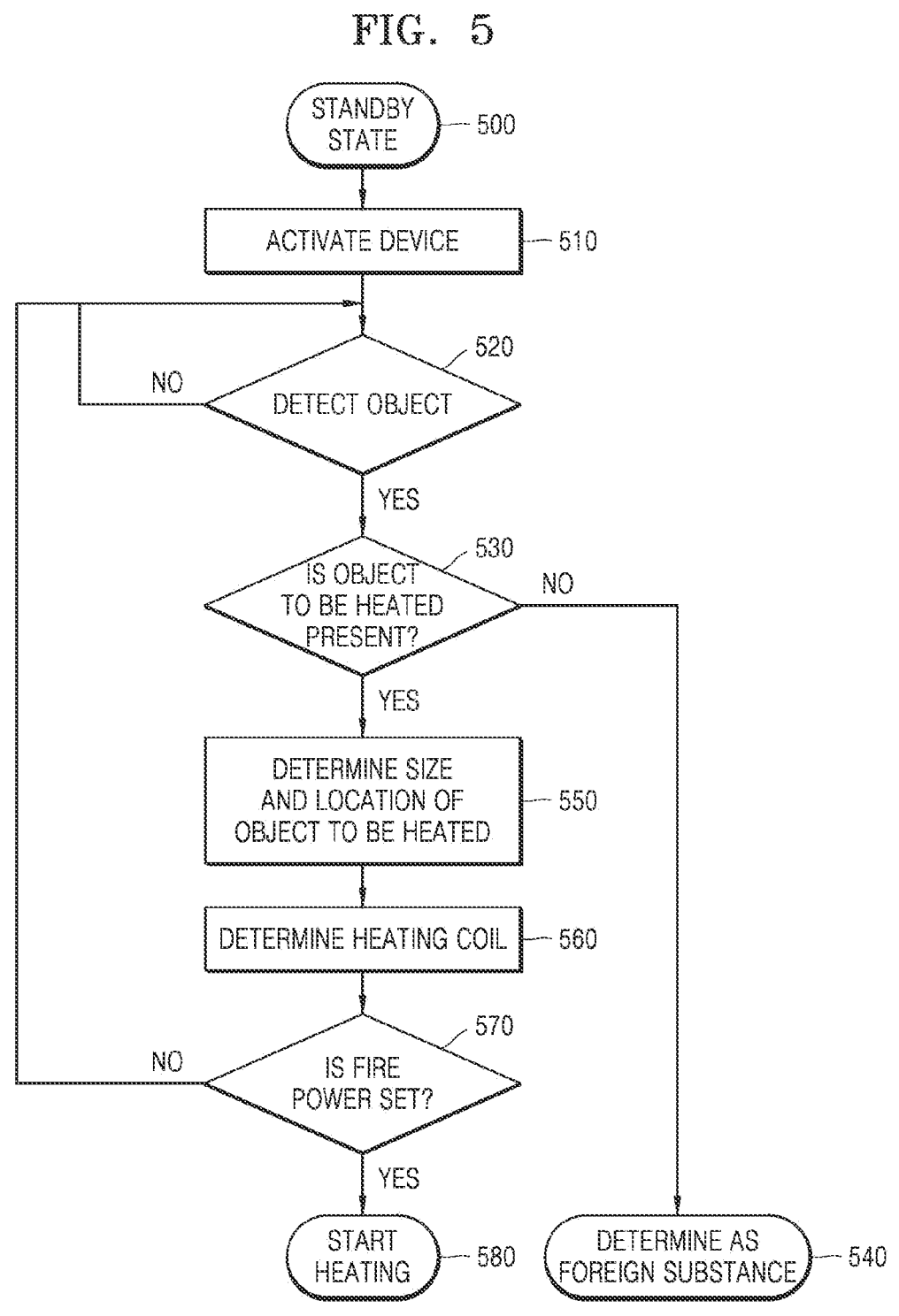

STANDBY STATE — 500

↓

ACTIVATE DEVICE — 510

↓

DETECT OBJECT — 520

NO ←

YES

↓

IS OBJECT TO BE HEATED PRESENT? — 530

NO →

YES

↓

DETERMINE SIZE AND LOCATION OF OBJECT TO BE HEATED — 550

↓

DETERMINE HEATING COIL — 560

↓

IS FIRE POWER SET? — 570

NO ←

YES

↓

START HEATING — 580

DETERMINE AS FOREIGN SUBSTANCE — 540

FIG. 6

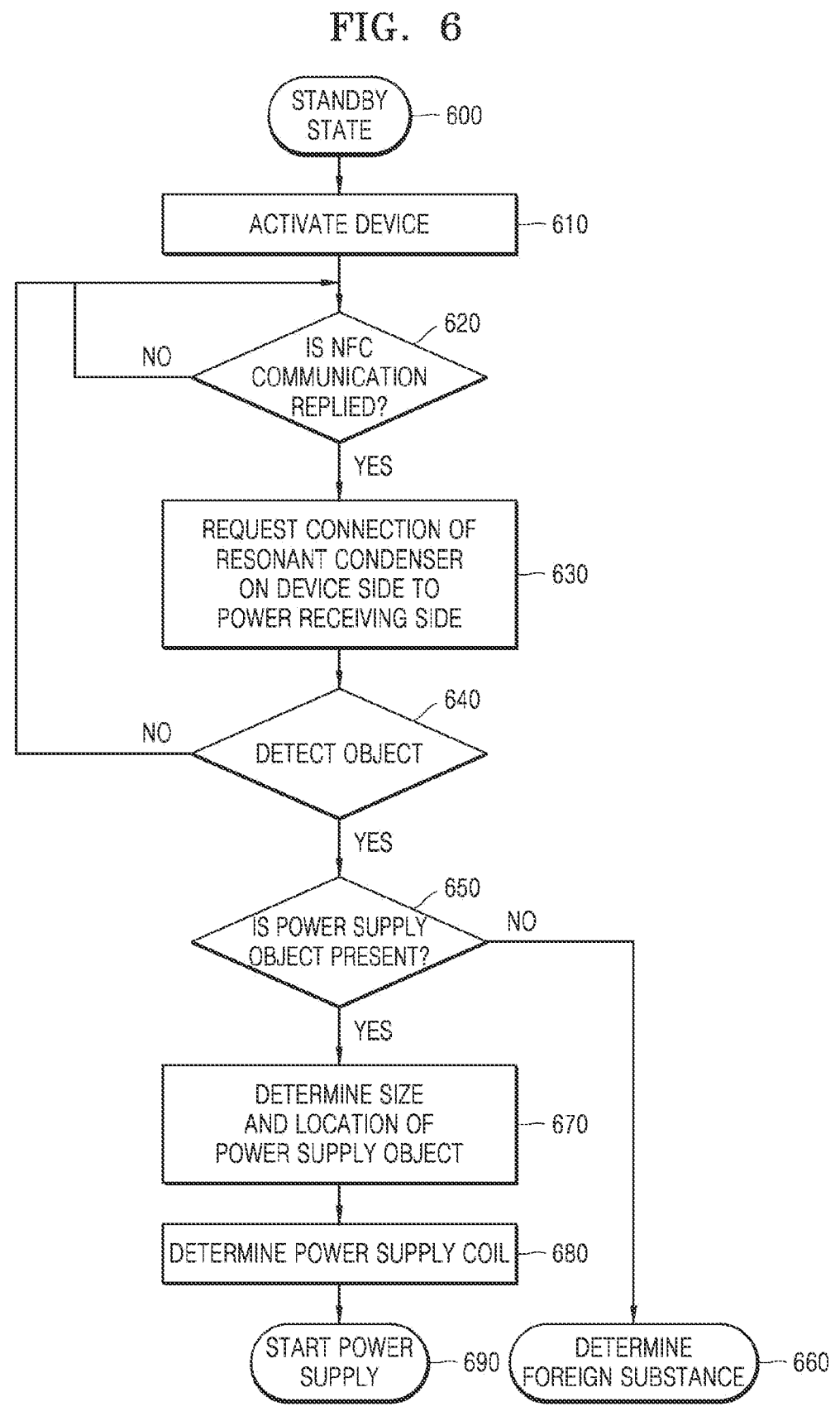

STANDBY STATE — 600

ACTIVATE DEVICE — 610

IS NFC COMMUNICATION REPLIED? — 620

NO

YES

REQUEST CONNECTION OF RESONANT CONDENSER ON DEVICE SIDE TO POWER RECEIVING SIDE — 630

DETECT OBJECT — 640

NO

YES

IS POWER SUPPLY OBJECT PRESENT? — 650

NO

YES

DETERMINE SIZE AND LOCATION OF POWER SUPPLY OBJECT — 670

DETERMINE POWER SUPPLY COIL — 680

START POWER SUPPLY — 690

DETERMINE FOREIGN SUBSTANCE — 660

FIG. 7

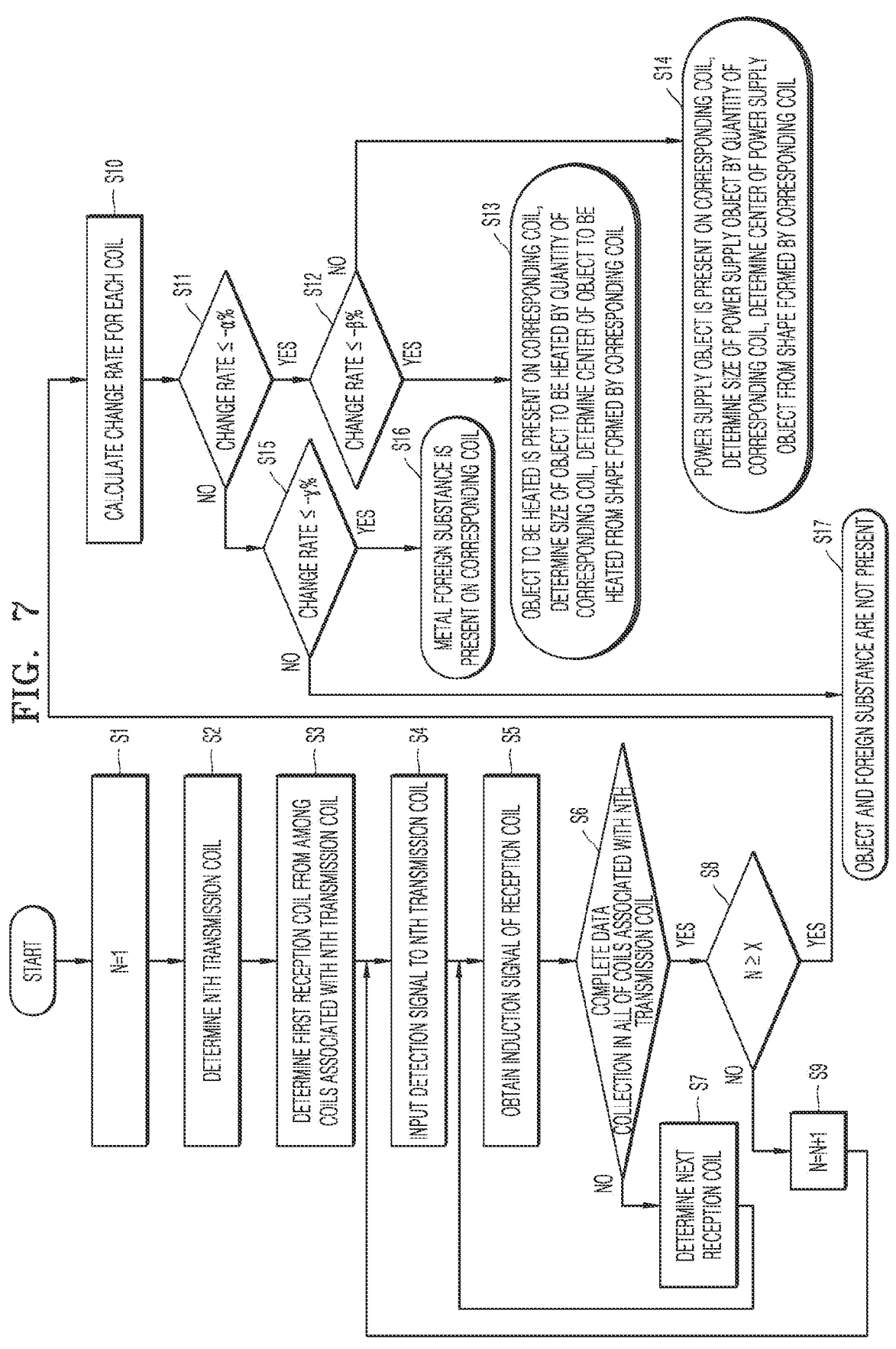

START

N=1 — S1

DETERMINE NTH TRANSMISSION COIL — S2

DETERMINE FIRST RECEPTION COIL FROM AMONG COILS ASSOCIATED WITH NTH TRANSMISSION COIL — S3

INPUT DETECTION SIGNAL TO NTH TRANSMISSION COIL — S4

OBTAIN INDUCTION SIGNAL OF RECEPTION COIL — S5

COMPLETE DATA COLLECTION IN ALL OF COILS ASSOCIATED WITH NTH TRANSMISSION COIL — S6

NO → DETERMINE NEXT RECEPTION COIL — S7

N ≥ X — S8

NO → N=N+1 — S9

YES

CALCULATE CHANGE RATE FOR EACH COIL — S10

CHANGE RATE ≤ −α% — S11

YES

CHANGE RATE ≤ −β% — S12

NO

YES

CHANGE RATE ≤ −γ% — S15

NO

YES

METAL FOREIGN SUBSTANCE IS PRESENT ON CORRESPONDING COIL — S16

OBJECT TO BE HEATED IS PRESENT ON CORRESPONDING COIL, DETERMINE SIZE OF OBJECT TO BE HEATED BY QUANTITY OF CORRESPONDING COIL, DETERMINE CENTER OF OBJECT TO BE HEATED FROM SHAPE FORMED BY CORRESPONDING COIL — S13

POWER SUPPLY OBJECT IS PRESENT ON CORRESPONDING COIL, DETERMINE SIZE OF POWER SUPPLY OBJECT BY QUANTITY OF CORRESPONDING COIL, DETERMINE CENTER OF POWER SUPPLY OBJECT FROM SHAPE FORMED BY CORRESPONDING COIL — S14

OBJECT AND FOREIGN SUBSTANCE ARE NOT PRESENT — S17

FIG. 10

ENERGY SUPPLY DEVICE

CROSS-REFERENCE TO RELATED APPLICATION(S)

This application is a Bypass Continuation of International Application No. PCT/KR2022/011911, filed Aug. 10, 2022, which claims priority to Japanese Patent Application No. 2021139749, filed Aug. 30, 2021, the disclosures of which are herein incorporated by reference in their entirety.

BACKGROUND

1. Field

The disclosure relates to an energy supply device capable of supplying energy to an object without contact.

2. Description of Related Art

In related art, energy such as heat or power is supplied to an object without contact by using an induction current due to a high-frequency magnetic field. For example, energy supply devices such as induction heating devices or wireless power supply devices have been known. As such energy supply devices, for example, in the patent document Japanese Patent Application Laid-Open No. 2016-220523, a wireless power transmission system having a foreign substance detection function for detecting foreign substances such as metal chips present around a wireless power transmission unit is disclosed.

SUMMARY

The disclosure may be implemented in a variety of ways, including a method, system, device, or computer program stored on a computer-readable storage medium.

An energy supply device that supplies energy to an object, according to an embodiment of the disclosure, may include at least one processor, and a plurality of coils connected to a resonant condenser for energy supply and an inverter circuit. In an embodiment, the at least one processor may determine a first coil from among the plurality of coils as a transmission coil. In an embodiment, the at least one processor may determine a second coil from among the plurality of coils as a reception coil. In an embodiment, the at least one processor may control a detection signal to be transmitted to the first coil through a transmission circuit connected to the first coil. In an embodiment, the at least one processor may control an induction signal induced in the second coil by the detection signal to be obtained through a reception circuit connected to the second coil. In an embodiment, the at least one processor may detect the object on the energy supply device based on the obtained induction signal.

A method of detecting an object by an energy supply device, according to an embodiment of the disclosure, may include determining, by at least one processor included in the energy supply device, a first coil from among a plurality of coils as a transmission coil. In an embodiment, the method may include determining, by the at least one processor, a second coil from among the plurality of coils as a reception coil. In an embodiment, the method may include controlling, by the at least one processor, a detection signal to be transmitted to the first coil through a transmission circuit connected to the first coil. In an embodiment, the method may include controlling, by the at least one processor, an induction signal induced in the second coil by the detection signal to be obtained through a reception circuit connected to the second coil. In an embodiment, the method may include detecting, by the at least one processor, the object on the energy supply device based on the obtained induction signal.

A program for performing, on a computer, a method of detecting an object by an energy supply device, according to an embodiment of the disclosure, may be recorded on a computer-readable recording medium.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5 illustrates a flowchart of an example of an energy supply device operating in an induction heating mode, according to an embodiment of the disclosure;

FIG. 6 illustrates a flowchart of an example of an energy supply device operating in a wireless power supply mode, according to an embodiment of the disclosure;

FIG. 7 illustrates a flowchart of an example of an object detection operation of an energy supply device, according to an embodiment of the disclosure;

FIG. 10 illustrates a schematic diagram of a circuit configuration of an energy supply device, according to an embodiment of the disclosure.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Below, an energy supply device 100 according to an embodiment of the disclosure is described with reference to the drawings.

In the present specification, "switching" may refer to selecting one (or an arbitrary number of) element from among a plurality of elements and not selecting the rest. For example, "switching A, B, and C in order to determine a transmission coil" may mean selecting A as a transmission coil and performing an operation, then selecting B as the transmission coil and performing the operation, and after selecting B as the transmission coil and performing the operation, selecting C as the transmission coil and performing the operation.

In the present specification, "switchably connected" may mean selectively connected. For example, "A and B are switchably connected to C" means that, depending on the control signal, A and C may be electrically connected and B and C may be electrically disconnected, or A and C may be electrically disconnected and B and C may be electrically connected.

Figure 1:
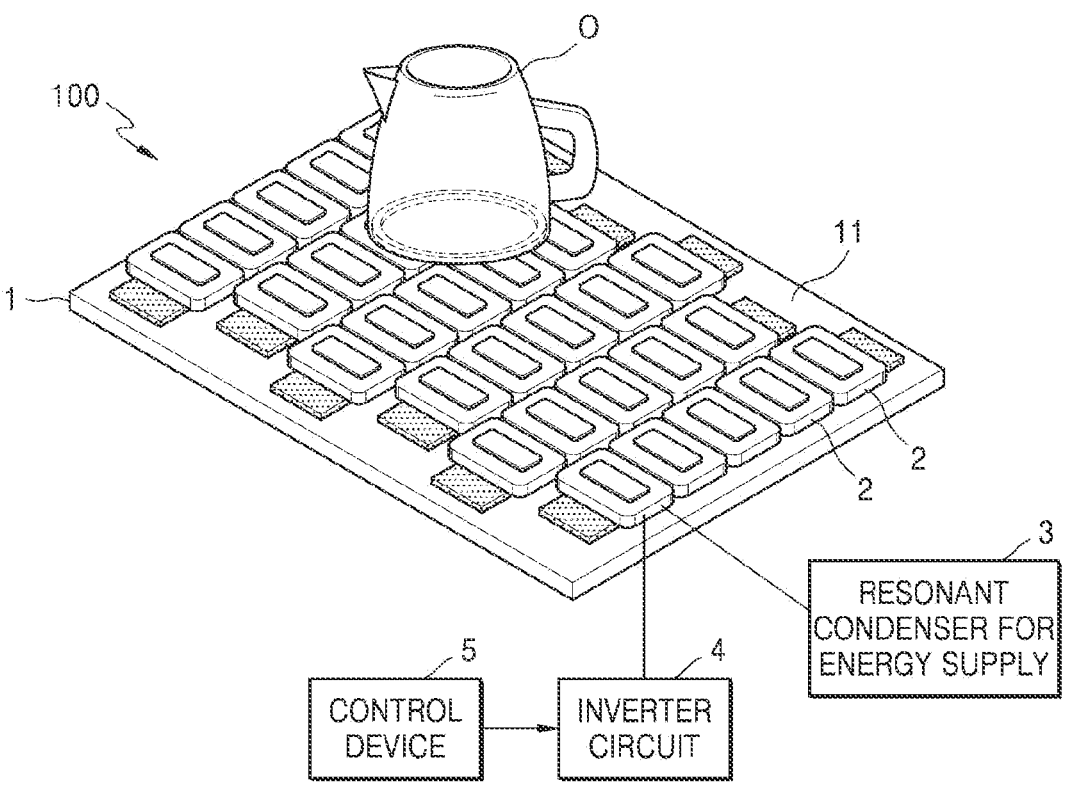
FIG. 1 schematically illustrates, a perspective view of a configuration of an energy supply device, according to an embodiment of the disclosure.

FIG. 1 schematically illustrates a perspective view of a configuration of an energy supply device, according to an embodiment of the disclosure.

<Device Configuration>

The energy supply device 100 according to an embodiment of the disclosure may be an electronic device that supplies energy to an object O on the energy supply device 100. In an embodiment, the energy supply device 100 may supply energy, such as power or heat, to the object O without contact based on the principle of electromagnetic induction. For example, the energy supply device 100 may inductively heat a metal object (e.g., a metal cooking utensil such as a pot or frying pan). For example, the energy supply device 100 may wirelessly supply power to an electric device (e.g., an electric kettle, etc.).

As shown in FIG. 1, the energy supply device 100 may include a top plate 1 on which an object O such as a cooking utensil or electric device is placed. The energy supply device 100 may include a plurality of coils 2 that is arranged below the top plate 1 and supplies energy to the object O. The energy supply device 100 may include a resonant condenser 3 for energy supply connected in series to each of the coils 2, and an inverter circuit 4 for supplying alternating current to each of the coils 2. The energy supply device 100 may include a control device 5 for controlling each inverter circuit 4.

The energy supply device 100 may be an electronic device that performs at least one of an induction heating operation for inductively heating a cooking utensil and power supply operation for wirelessly supplying power to an electronic device. In an embodiment, the energy supply device 100 may be configured to switch between the induction heating operation and the power supply operation as a switch (not shown) is operated. In other words, as the switch is operated, the energy supply device 100 may be selectively set to the induction heating mode or the power supply mode.

The top plate 1 may be a plate-shaped component having a flat surface 11 on which the object O may be placed. For example, the top plate 1 may be composed of an insulating material such as glass or ceramic, but is not limited thereto. In addition, in FIG. 1, a rectangular top plate is shown. However, the disclosure is not limited thereto.

The coil 2 may heat the object O as a heating coil during an induction heating operation. Additionally or alternatively, the coil 2 may supply power to the object O as a power supply coil during a power supply operation. In an embodiment, each of the coils 2 may be arranged at the rear (i.e., below the top plate 1) of a placement surface 11. Each of the coils 2 may be a solenoid-type coil formed by winding a conductive wire around a magnetic core made of a magnetic material such as ferrite. As shown in FIG. 1, each of the coils 2 may be configured such that the conductive wire thereof is wound around an axis perpendicular to the mounting surface 11. In other words, each of the coils 2 may be arranged such that the axis thereof is parallel to a vertical direction.

Figure 2:
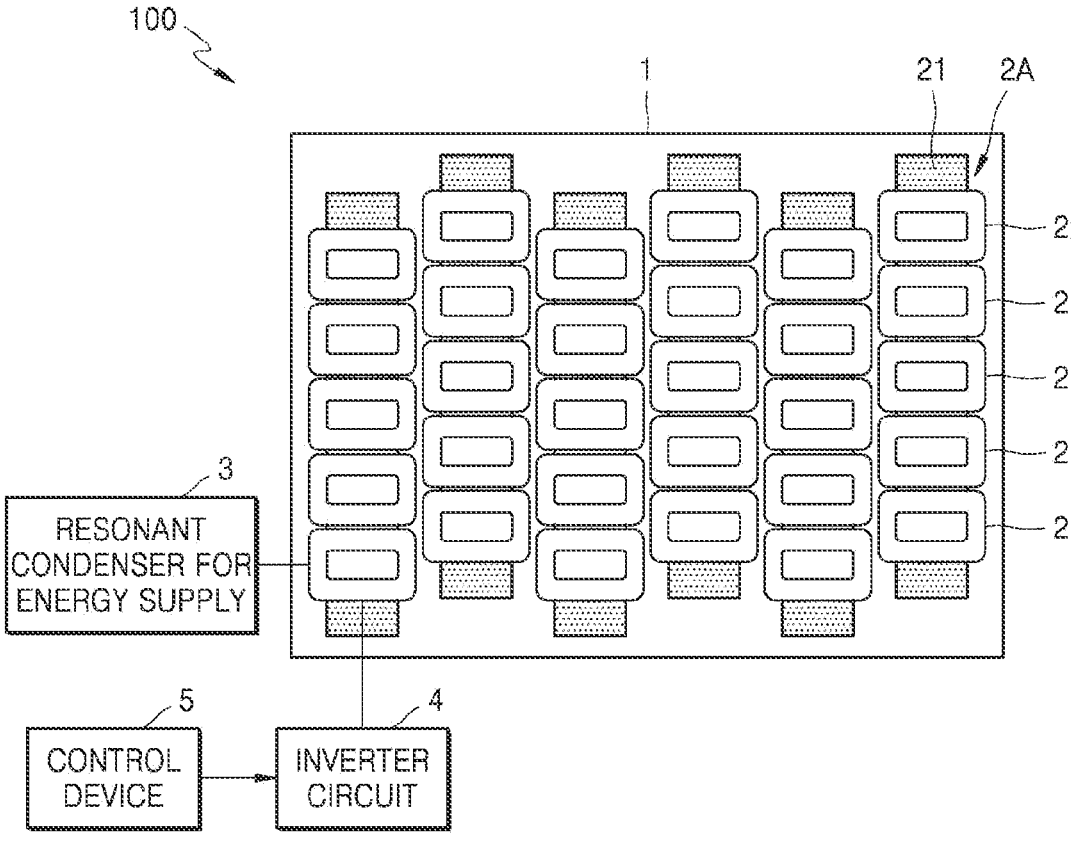
FIG. 2 schematically illustrates, a plan view of a configuration of an energy supply device, according to an embodiment of the disclosure.

FIG. 2 schematically illustrates a plan view of a configuration of an energy supply device, according to an embodiment of the disclosure.

As shown in FIG. 2, the plurality of coils 2 all have the same shape and size, and may be arranged to form a two-dimensional array structure (e.g., a vertical and horizontal matrix shape) in a plan view, but the disclosure is not limited thereto.

Specifically, in the energy supply device 100, a plurality of (five) coils 2 are arranged in a column at equal intervals to form a set of coil arrays 2A, and these coil arrays 2A may be arranged side by side in a plurality of columns (six columns) in parallel. In a plan view, each coil array 2A may be alternately arranged with coils in adjacent columns. A magnetic core (21) may be configured to be shared between a plurality of coils 2 adjacent to each other. For example, in each coil array 2A, the magnetic core 21 may be shared between the plurality of coils 2 forming one column.

In an embodiment, the plurality of coils 2 of the energy supply device 100 may be connected to the resonant condenser 3 for energy supply. The resonant condenser 3 for energy supply may be connected in series to the coils 2 to form a resonant circuit (e.g., an LC series resonant circuit). For example, each of the plurality of coils 2 may be individually connected to the resonant condenser 3 for energy supply.

In an embodiment, the plurality of coils 2 of the energy supply device 100 may be connected to the inverter circuit 4. The inverter circuit 4 may convert an alternating current voltage supplied from a power source into an arbitrary frequency and output the frequency to the coil 2. Each of the plurality of coils 2 may be individually connected to the inverter circuit 4. According to an embodiment, the energy supply device 100 may include a plurality of inverter circuits 4 respectively corresponding to the plurality of coils 2. For example, the inverter circuits 4 may be connected to all arranged coils 2 in a one-to-one correspondence. For example, the inverter circuit 4 may be of a half-bridge type using a semiconductor switching element, but is not limited thereto and may be of a full-bridge type.

The control device 5 may be a computing device having at least one processor, memory, input/output device, etc. The at least one processor may be electrically connected to elements included in the energy supply device 100 and may perform operations or data processing related to control and/or communication of the elements included in the energy supply device 100. In an embodiment, the at least one processor may include at least one of a central processing unit (CPU), an application processor (AP), a graphics processing unit (GPU), or a neural processing unit (NPU).

The at least one processor of the control device 5 may perform operations according to an embodiment of the disclosure by operating according to the program stored in a memory. In an embodiment, the control device 5 may control the inverter circuit 4 corresponding to each of the plurality of circuits. For example, the processor of the control device 5 may individually control each inverter circuit 4 by operating according to a program stored in the memory.

The elements of the energy supply device 100 are not limited to those shown in FIGS. 1 and 2, and may additionally include elements not shown in FIGS. 1 and 2, or some of the elements shown in FIGS. 1 and 2 may be omitted. In addition, a shape, size, arrangement, and quantity of the plurality of coils 2 of the energy supply device 100 are not limited those shown in FIG. 2.

Figure 3:
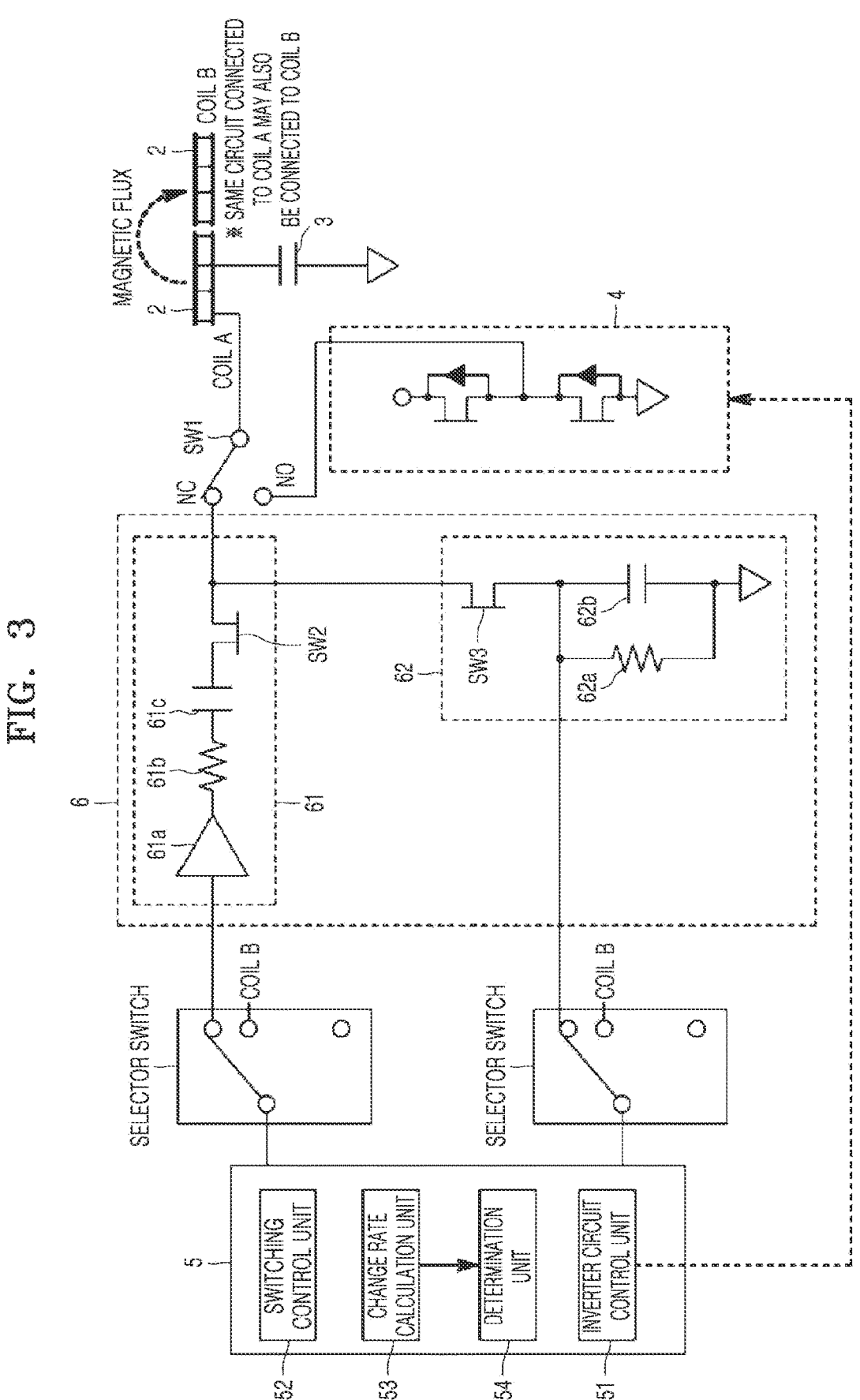
FIG. 3 illustrates a schematic diagram of a circuit configuration of an energy supply device, according to an embodiment of the disclosure.

FIG. 3 illustrates a schematic diagram of a circuit configuration of an energy supply device, according to an embodiment of the disclosure.

In an embodiment, the plurality of coils 2 of the energy supply device (e.g., the energy supply device in FIG. 1) may be connected to the resonant condenser 3 for energy supply. As shown in FIG. 3, the resonant condenser 3 for energy supply may be connected in series to the coils 2 to form a resonant circuit (e.g., an LC series resonant circuit).

The control device 5 may include an inverter circuit control unit 51, a switching control unit 52, a change rate calculation unit 53, and a determination unit 54, but is not limited thereto. In an embodiment, the inverter circuit control unit 51, the switching control unit 52, the change rate calculation unit 53, and/or the determination unit 54 may be terms used to distinguish operations performed by the at least one processor of the control device 5. In other words, the at least one processor of the control device 5 may perform operations as the inverter circuit control unit 51, the switching control unit 52, the change rate calculation unit 53, and/or the determination unit 54. Additionally or alternatively, the inverter circuit control unit 51, the switching control unit 52, the change rate calculation unit 53, and/or the determination unit 54 may refer to hardware configurations included within the control device 5 to perform each function. Additionally or alternatively, the inverter circuit control unit 51, the switching control unit 52, the change rate calculation unit 53, and/or the determination unit 54 may refer to software configurations such as programs, algorithms, or instructions stored in the memory for the control device 5 to perform each function.

In an embodiment, the at least one processor of the control device 5 may operate according to a program stored in the memory, thereby performing actions as the inverter circuit control unit 51 for individually controlling each inverter circuit 4, as shown in FIG. 3. For example, the inverter circuit control unit 51 may individually control operations of the inverter circuit 4 connected to each coil 2, thereby individually adjusting an on/off, frequency (e.g., from a low frequency band of less than or equal to 3 kHz to a high frequency band of 10 kHz to 100 kHz), phase, and voltage of the current flowing in each coil 2. Additionally or alternatively, the inverter circuit control unit 51 may individually change a direction of magnetic flux generated from each coil 2 by changing a direction of the current flowing in each coil 2.

According to an embodiment of the disclosure, the inverter circuit control unit 51 may selectively energize the coil 2 located below the object O placed on the top plate 1 from among the plurality of coils 2. In other words, in order to supply energy to the object, the control device 5 may control to energize only the coil 2 located below the object from among the plurality of coils.

In an induction heating mode, the inverter circuit control unit 51 may control each inverter circuit 4 to inductively heat the object O placed on the top plate 1. Additionally or alternatively, in a power supply mode, the inverter circuit control unit 51 may control each inverter circuit 4 to supply power to the object O. In an embodiment, the inverter circuit control unit 51 may switch the induction heating mode and the power supply mode by switching the direction of the current flowing in each coil 2. In other words, the inverter circuit control unit 51 may control the energy supply device to perform an induction heating function or a power supply function by changing the direction of the current flowing in each coil 2.

The energy supply device may include a detection circuit 6 for detecting an object. In an embodiment, the energy supply device may include the detection circuit 6 for detecting at least one of a type, location, and size of the object O placed on the top plate 1. Each of the plurality of coils may be connected to the detection circuit 6. As shown in FIG. 3, the detection circuit 6 may include a transmission circuit 61 configured to transmit a detection signal of a specific frequency to a coil (e.g., coil A) connected to the detection circuit 6. In addition, the detection circuit 6 may include a reception circuit 62 configured to detect an induction signal (e.g., current or voltage) induced in a coil (e.g., coil A) connected to the detection circuit 6 by a detection signal transmitted to another coil (e.g., coil B).

In an embodiment, the detection circuit 6 may be connected in series to the coil 2 through a switch SW1 that may be opened and closed. The switch SW1 may be a double throw type switch. As shown in FIG. 3, the detection circuit 6 and the inverter circuit 4 may be switchably connected to the coil 2. In other words, by operating the switch according to a control signal, the coil 2 may be electrically connected to the detection circuit 6 and electrically disconnected from the inverter circuit 4. Likewise, by operating the switch according to a control signal, the coil 2 may be electrically disconnected from the detection circuit 6 and electrically connected to the inverter circuit 4.

The control device 5 may determine a first coil from among the plurality of coils 2 as a transmission coil through which a detection signal is to be transmitted. In addition, the control device 5 may determine a second coil from among the plurality of coils 2 as a reception coil through which an induction signal is to be transmitted. In an embodiment, the switching control unit 52 of the control device 5 may sequentially switch a plurality of coils and determine the coils as transmission coils. In addition, the switching control unit 52 of the control device 5 may sequentially switch one or more coils located around a coil determined as the transmission coil to determine the coils as the reception coils.

According to the energy supply device according to an embodiment of the disclosure, the plurality of coils 2 are configured to be sequentially switched by the switching control unit 52 and selected as a transmission coil and a reception coil, and thus, the plurality of coils 2 arranged below the top plate 1 may be used as transmission coils or reception coils. Accordingly, the control device 5 may set the plurality of coils 2 arranged below the top plate 1 as transmission coils and reception coils in various combinations, and detect voltage or current in each reception coil according to a detection signal, thereby detecting a type, location, and size of the object O placed on the top plate 1.

In an embodiment, the plurality of transmission circuits 61 may be connected to the control device 5 to be switchable through a selector switch. For example, by operating the selector switch according to a control signal, the control device 5 may be electrically connected a transmission circuit of a coil determined as the transmission coil and electrically disconnected from transmission circuits of other coils. For example, when the first coil from among the plurality of coils 2 is determined as the transmission coil, the control device 5 may control the selector switch to output a transmission coil through a transmission coil connected to the first coil from among the plurality of transmission circuits 61.

In an embodiment, the plurality of reception circuits 62 may be connected to the control device 5 to be switchable through the selector switch. For example, by operating the selector switch according to a control signal, the control device 5 may be electrically connected to a reception circuit of a coil determined as the reception coil and electrically disconnected to reception circuits of other coils. For example, when a second coil from among the plurality of coils 2 is determined as the reception coil, the control device 5 may control the selector switch to obtain an induction signal through a reception circuit connected to the second coil from among the plurality of reception circuits 62. In other words, the control device 5 may detect voltage or current induced in the second coil by a detection signal through the reception circuit connected to the second coil.

Figure 4:
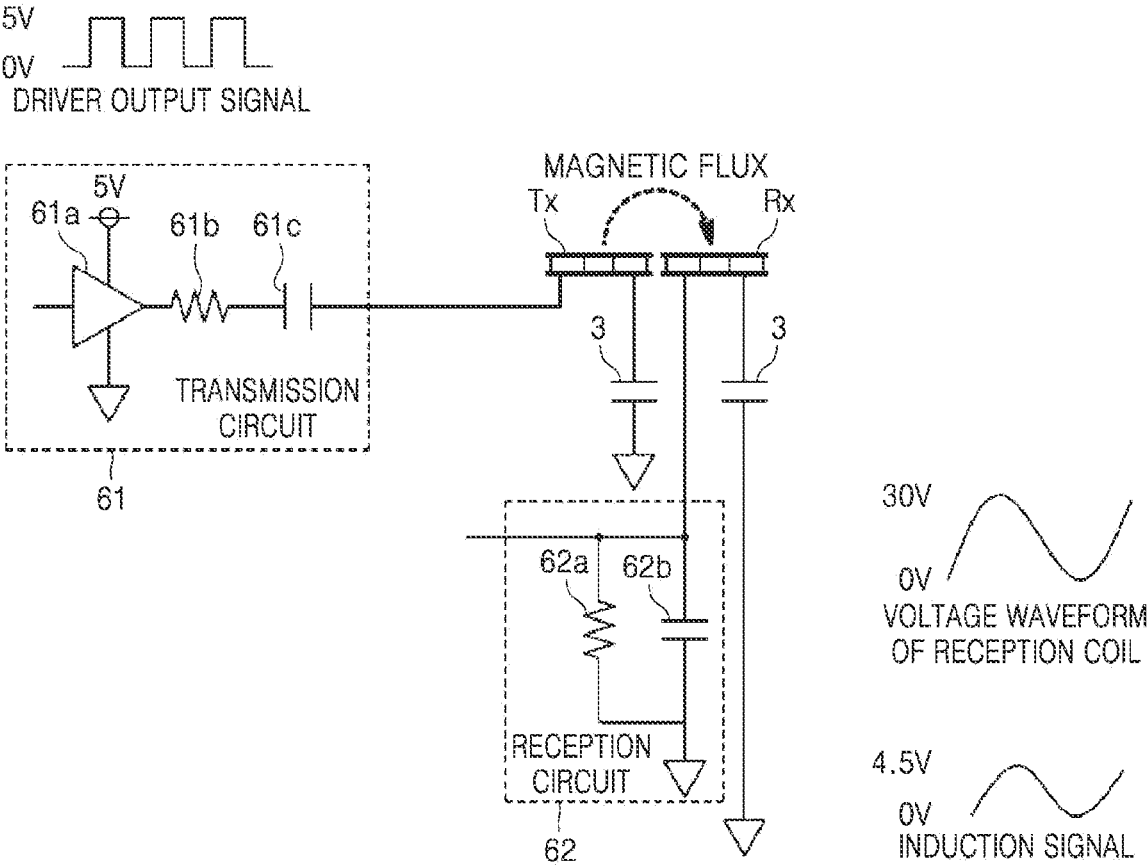
FIG. 4 illustrates a schematic diagram of a circuit configuration of an energy supply device, according to an embodiment of the disclosure.

FIG. 4 illustrates a schematic diagram of a circuit configuration of an energy supply device, according to an embodiment of the disclosure.

In an embodiment, each of the plurality of coils may be individually connected to the transmission circuit 61. As shown in FIG. 4, the transmission coil 61 may be connected in series to a coil. The transmission coil 61 may include a driver 61*a* and a resistor 61*b* (e.g., a current limiting resistor), that are connected in series to each other, and a resonant condenser 61*c* for detection, but is not limited thereto. Additionally, referring to FIG. 3, the transmission circuit 61 may be connected to the coil 2 through an opening/closing switch SW2 such as a semiconductor switch.

In an embodiment, each of the plurality of coils may be individually connected to the reception circuit 62. The reception circuit 62 may be connected in series to a coil. The reception circuit 62 may include a resistor 62*a* and a resonant condenser 62*b* for detection, that are connected in parallel to each other, but is not limited thereto. Additionally, referring to FIG. 3, the reception circuit 62 may be connected to the coil 2 through an opening/closing switch SW3 such as a semiconductor switch.

In order to detect an object on an energy supply device (e.g., the energy supply device in FIG. 1), a control device may output a detection signal to a transmission coil Tx through the transmission circuit 61. In an embodiment, at least one processor of the control device may control to transmit a detection signal to the transmission coil Tx through the transmission circuit 61. For example, the at least one processor may control the transmission circuit 61 to thereby transmit a detection signal to the transmission coil Tx. Additionally or alternatively, the at least one processor may control a signal output module (e.g., a module for supplying current to a transmission circuit) connected to the transmission circuit to transmit a detection signal. As shown in FIG. 4, the control device may output a square wave signal (e.g., a driver output signal) of a specific frequency to the transmission coil Tx as a detection signal through the transmission circuit 61.

The control device 5 may detect current or voltage induced in a reception coil Rx that magnetically resonates by the detection signal through the reception circuit 62. In an embodiment, the at least one processor of the control device may control such that an induction signal induced in the reception coil Rx by the detection signal is obtained through the reception circuit 62. For example, the at least one processor may control the reception circuit 62 to obtain an induction signal. Additionally or alternatively, in order to obtain an induction signal, the at least one processor may control a signal input module (e.g., a module for calculating current or voltage value of an induction signal from current flowing in the reception circuit) connected to the reception circuit.

A frequency of the detection signal may be different from a frequency of alternating current voltage supplied from an inverter circuit to a coil in an induction heating mode and a power supply mode. In an embodiment, the frequency of the detection signal may be set to be at least 10% higher than a frequency of the alternating current voltage supplied from the inverter circuit to the coil. In an embodiment, the frequency of the detection signal may be set to be at least 10% lower than the frequency of the alternating current voltage supplied from the inverter circuit to the coil.

FIG. 5 illustrates a flowchart of an example of an energy supply device operating in an induction heating mode, according to an embodiment of the disclosure.

The energy supply device (e.g., the energy supply device in FIG. 1) may correspond to an electronic device for inductively heating an object. For example, upon receiving a user input, the energy supply device may be set to an induction heating mode from among a plurality of modes. FIG. 5 shows an example of an operation for inductively heating an object by the energy supply device. However, the disclosure is not limited thereto, and any one of the operations shown in FIG. 5 may be omitted, and an operation not shown in FIG. 5 may be further included, and the operations may be performed in a different order.

The control device of the energy supply device may be in a standby state (operation 500). Here, the standby state may include a state in which power supply is terminated and a power saving state. In operation 510, the control device may be activated to supply energy to an object. For example, by an input operation of a user, power of the energy supply device may be turned on. As the power is turned on, the control device may be activated to perform operations for energy supply.

In operation 520, the control device may detect an object on the energy supply device. The object may be a metal object. For example, the control device may detect metal objects on the top plate.

When it is determined that an object is present on the energy supply device, in operation 530, the control device may determine whether the detected object is an object to be heated. For example, the control device may determine whether the metal object present on the top plate is an object to be heated.

When it is determined that the detected object is not an object to be heated, in operation 540, the control device may determine the detected object as a foreign substance. In other words, the control device may determine that the metal object present on the top plate is a foreign substance.

Unlike this, when it is determined that the detected object is an object to be heated, in operation 550, a control device 5 may determine a size and position of the object to be heated according to the object detection result. Based on the determined size and position of the object to be heated, in operation 560, the control device 5 may determine a coil to be used for induction heating, i.e., a heating coil, from among a plurality of coils.

In operation 570, the control device 5 may determine whether fire power has been set. For example, fire power may be set by an input operation of the user. Additionally or alternatively, the fire power may be set according to a preset value.

When it is determined that the fire power has not been set, the control device may return to operation 520. When it is determined that the fire power has been set, in operation 580, the control device may start heating the object to be heated with the set fire power.

The control device may perform operations for heating the object to be heated. In an embodiment, in the induction heating mode, the inverter circuit control unit of the control device may control each inverter circuit such that directions of magnetic flux generated from adjacent coils are opposite to each other. For example, the control device may control each inverter circuit such that, in each coil array, directions of current flowing to adjacent coils are opposite to each other, and the directions of magnetic flux generated from these coils are opposite to each other. For example, in the induction heating mode, the inverter circuit control unit may control each inverter circuit such that a high-frequency current of 10 kHz or more flows in each coil (e.g., a heating coil).

FIG. 6 illustrates a flowchart of an example of an energy supply device operating in a wireless power supply mode, according to an embodiment of the disclosure.

The energy supply device (e.g., the energy supply device in FIG. 1) may correspond to an electronic device for wirelessly supplying power to an object. For example, upon receiving a user input, the energy supply device may be set to a wireless power supply mode from among a plurality of modes. FIG. 6 shows an example of an operation of supplying power to an object by the energy supply device. However, the disclosure is not limited thereto, and any one of the operations shown in FIG. 6 may be omitted, or an operation not shown in FIG. 6 may be further included, and the operations may be performed in a different order.

The control device of the energy supply device may be in a standby state (operation 600). Here, the standby state may include a state in which power supply is terminated and a power saving state.

In operation 610, the control device may be activated to supply energy to an object. For example, by an input operation of the user, power of the energy supply device may be turned on. As the power is turned on, the control device may be activated to perform operations for energy supply.

In the wireless power supply mode, the control device may perform communication with a power supply object through near field communication (NFC) communication. For example, in operation 620, the control device may determine whether there is a reply to the NFC communication from the power supply object. When it is determined that there is a reply to the NFC communication, in operation 630, the control device may request connection of a resonant condenser to the power supply object. For example, the control device may request a power receiving side (i.e., the power supply object) to connect to the resonant condenser of the energy supply device.

In operation 640, the control device may detect an object on the energy supply device. The object may be a metal object. For example, the control device may detect a metal object on the top plate.

When it is determined that an object is present on the energy supply device, in operation 650, the control device may determine whether the detected object is a power supply object. For example, the control device may determine whether the metal object present on the top plate is a power supply object.

When it is determined that the detected object is not a power supply object, in operation 660, the control device may determine the detected object as a foreign substance. In other words, the control device may determine that the metal object present on the top plate is a foreign substance.

Unlike this, when it is determined that the detected object is a power supply mode, in operation 670, a control device may determine a size and position of the power supply object according to the object detection result.

In operation 680, based on the determined size and position of the power supply object, the control device may determine a coil to be used for power supply, i.e., a power supply coil, form among a plurality of coils.

In operation 690, the control device may start supplying power to the power supply object.

The control device may perform operations for supplying power to the power supply object. In an embodiment, in the power supply mode, the inverter circuit control unit of the control device may control each inverter circuit such that directions of magnetic flux in a coil within the power supply object (e.g., a coil positioned below the power supply object or a coil inside the power supply object) and coils therearound are opposite each other. For example, each inverter circuit may be controlled such that directions of current in the coil inside the power supply object and the coils therearound are opposite to each other, and directions of magnetic flux generated from these coils are opposite to each other. For example, in the power supply mode, the inverter circuit control unit may control each inverter circuit such that a high-frequency current of 10 kHz or more flows in each coil.

Each coil may receive an alternating current voltage from the inverter circuit and generate an oscillating magnetic field.

An object to which power may be supplied in the power supply mode may include a power receiving unit and load that accept power transmitted from the energy supply device and output the power to a load. The power receiving unit may include a secondary resonant circuit for generating an alternating current voltage by magnetic resonance with a resonant circuit of the energy supply device (e.g., a coil and a resonant condenser for energy supply, that are connected in series to each other), and a voltage conversion circuit for converting alternating current voltage output from the secondary resonant circuit into a desired voltage and supplying the voltage to a load. The secondary resonant circuit may be an LC series resonant circuit composed of a secondary coil and a secondary resonant condenser connected in series to each other.

FIG. 7 illustrates a flowchart of an example of an object detection operation of an energy supply device, according to an embodiment of the disclosure.

In order for the energy supply device (e.g., the energy supply device in FIG. 1) to perform an object detection process on a plurality of coils, a value of n in S1 may be initialized to 1. x in S8 is an arbitrary natural number and may indicate the number of coils to be selected as a transmission coil. For example, x may correspond to the number of a plurality of coils included in the energy supply device.

The control device of the energy supply device may repeat processes of S2 to S7 for an nth transmission coil until the value of n reaches the value of x. As shown, when the value of n is compared with the value of x in S8, and the value n is less than the value of x, the value of n increases by 1 (S9), and the control device may repeat processes of S2 to S7 described below. In other words, the control device may repeat processes S2 to S8 x times.

The switching control unit of the control device may select one arbitrary coil from among a plurality of coils as a transmission coil. In an embodiment, the control device may determine one coil from among a plurality of coils as an nth transmission coil, in operation S2. Because n is set to 1 in S1, in a first loop, the control device may determine a first transmission coil. In an embodiment, the switching control unit may sequentially switch a plurality of coils and determine the coils as transmission coils. Accordingly, the control device 5 may perform processes S3 to S7, that are described below, on the first transmission coil to an xth transmission coil.

The control device may determine one arbitrary coil from among coils associated with the nth transmission coil as a reception coil. Here, the coils associated with the nth transmission coil may refer to coils that may be determined as reception coils for the nth transmission coil (e.g., coils around the transmission coil). In an embodiment, the control device may switch the coils associated with the nth transmission coil and determine the coils as reception coils. Here, an order in which the coils associated with the nth transmission coil are switched to the reception coils may be preset or arbitrarily determined. In an embodiment, the control device may determine one coil (e.g., an adjacent one) located around the nth transmission coil as a first reception coil for the nth transmission coil, in operation S3.

The control device may transmit a detection signal of a specific frequency to the nth transmission coil through a transmission circuit, in operation S4. The frequency of the detection signal may be a preset frequency. In an embodiment, the at least one processor may control the transmission circuit to transmit the detection signal of the specific frequency to the nth transmission coil.

The control device may obtain an induction signal induced in the reception coil by the detection signal transmitted to the nth transmission coil, in operation S5. For example, the control device may detect a voltage or current induced in the reception coil by the detect signal. In an embodiment, the at least one processor may control the reception circuit to obtain the induction signal induced in the reception coil by the detection signal transmitted to the nth transmission coil. For example, the at least one processor may obtain the induction signal input through the reception circuit.

The control device may determine whether data collection is completed in all of the coils associated with the nth transmission coils, in operation S6. When data collection is not completed in all of the coils associated with the nth transmission coil, the switching control unit may determine a next reception coil from among the coils associated with the nth transmission coil, in operation S7, and the control device may repeatedly perform operations S4 and S5. In other words, the switching control unit may sequentially switch the coils associated with the nth transmission coil to the reception coils one by one until all voltages or current (i.e., induction signals) of the coils (e.g., adjacent coils) associated with the nth transmission coil are detected.

Through processes S1 to S9 described above, the control device may obtain induction reception data for each of the plurality of coils. For example, the control device may obtain induction signal data (i.e., induction signal data for each coil) including induction signals obtained while each coil is determined to be a reception coil.

The change rate calculation unit of the control device may calculate a change rate of each of the plurality of coils based on the induction signal data for each of the plurality of coils and reference data stored in the memory, in operation S10. In an embodiment, the change rate calculation unit may calculate a change rate [%] of the induction signal data for each coil from the reference data. For example, the change rate calculation unit may calculate a change rate of a first coil based on the induction signal data obtained while the first coil operates as a reception coil and reference data.

The reference data may be a voltage or current value of each reception coil when an object is not placed on the top plate. For example, the reference data may include induction signal data for each coil obtained in a state in which an object is not placed on each coil. The reference data may include different values for each of the plurality of coils. A change of the induction signal data for each coil from the reference data may be due to changes in impedance due to the object.

Based on the change rate (e.g., voltage or current change rate) for each coil calculated by the change rate calculation unit, the determination unit of the control device may detect an object for each coil, in operations S11 to S17. In an embodiment, the determination unit may determine at least one of a type, location, and size of an object placed on the top plate based on the change rate for each of the plurality of coils.

As shown in FIG. 7, the determination unit may determine whether an object is present on the energy supply device by comparing the change rate for each coil and a preset threshold. In an embodiment, the determination unit may compare the change rate for each coil and the preset thresholds ($\alpha$, $\beta$, $\gamma$) and determine the object placed on the top plate as any one of a power supply object, an object to be heated, and a metal foreign substance. Additionally, when it is determined that the object is a power supply object or an object to be heated, the determination unit may determine a location and size of the power supply object or the object to be heated.

Specifically, the determination unit may detect an object on each coil based on a first threshold $-\beta$ [%], a second threshold $-\alpha$ [%], and a third threshold $-\gamma$ [%]($-\beta < -\alpha < -\gamma$, e.g., $\beta$ is 95%, $\alpha$ is 30%, and $\gamma$ is 10%).

In an embodiment, the determination unit may determine that an object to be heated is present on a coil of which the change rate is $-\beta$ or less. Additionally, the determination unit may determine a size of the object to be heated according to quantity of coils having a change rate of $-\beta$ or less. Additionally, the determination unit may determine a location (e.g., a center location) of the object to be heated according to a location of the coil having a change rate of $-\beta$ or less or a shape formed by a coil having a change rate of $-\beta$ or less from among a plurality of coils. The control device may determine one or more coils from among the plurality of coils as a coil to be used for heating according to the size and location of the object to be heated, in operations S11, S12, and S13. Here, the coil to be used for heating may be the same as, different from, or partially different from the coil having a change rate of $-\beta$ or less.

In an embodiment, the determination unit may determine that a power supply object is present on a coil having a change rate greater than $-\beta$ and $-\alpha$ or less. Additionally, the determination unit may determine a size of the power supply object according to quantity of coils having the change rate greater than $-\beta$ and $-\alpha$ or less. Additionally, the determination unit may determine a location (e.g., a center location) of the power supply object according to a location of the coil having a change rate greater than $-\beta$ and $-\alpha$ or less or a shape of the coil having a change rate greater than $-\beta$ and $-\alpha$ or less. The control device may determine one or more coils from among the plurality of coils as a coil to be used for power supply according to the size and location of the power supply object, in operations S11, S12, and S14. Here, the coil to be used for power supply may be the same as, different from, or partially different from the coil having a change rate greater than $-\beta$ and $-\alpha$ or less.

In an embodiment, the determination unit may determine that a foreign substance is present on a coil having a change rate greater than $-\alpha$ and $-\gamma$ or less, in operations S11, S13, and S16. In an embodiment, the determination unit may determine that an object and a foreign substance are not present on the coil having the change rate greater than $-\gamma$, in operations S11, S13, and S17.

In FIG. 7, the determination unit determines the presence of a foreign substance, a power supply object, and an object to be heated based on three thresholds. However, the disclosure is not limited thereto. For example, in the power supply mode, the determination unit may only determine whether a power supply object is present. For example, in the heating mode, the determination unit may only determine whether an object to be heated is present.

Figure 8:
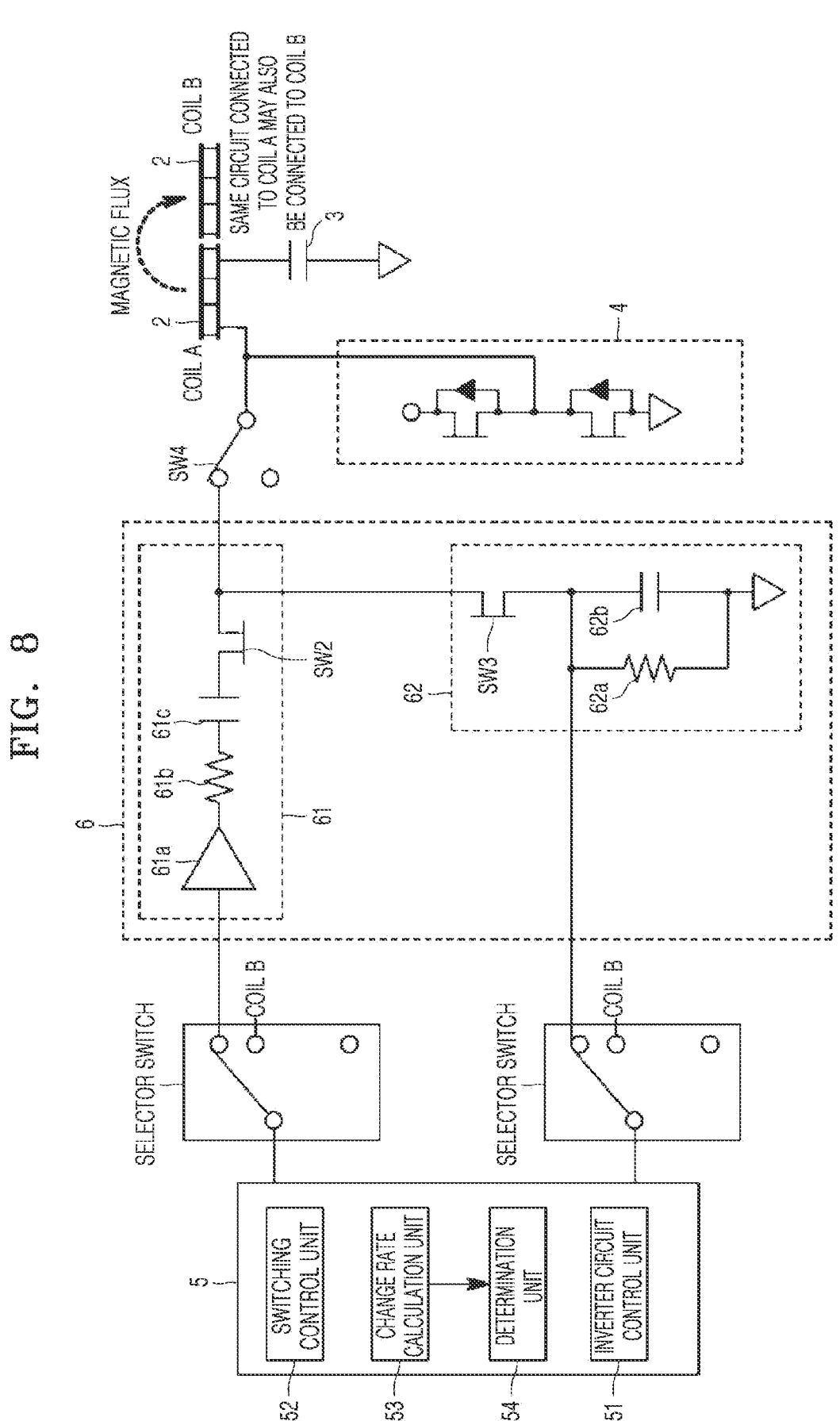
FIG. 8 illustrates a schematic diagram of a circuit configuration of an energy supply device, according to an embodiment of the disclosure.

FIG. 8 illustrates a schematic diagram of a circuit configuration of an energy supply device, according to an embodiment of the disclosure.

Referring to FIG. 3, in the energy supply device, the detection circuit 6 and the inverter circuit 4 may be connected to the coil 2 to be switchable by the switch SW1. However, the disclosure is not limited thereto. According to an embodiment, as shown in FIG. 8, the inverter circuit 4 may be always electrically connected to the coil 2, and the detection circuit 6 may be connected to the coil 2 through an opening/closing switch SW4. In other words, by operating the switch according to a control signal, the coil 2 may be electrically connected to or electrically disconnected from the detection circuit 6. In this case, because the control device 5 does not perform turn on/off of current of the inverter circuit 4 by using the opening/closing switch SW4, the opening/closing switch SW4 may be miniaturized, and thinness of the inverter circuit 4 may be promoted.

Figure 9:
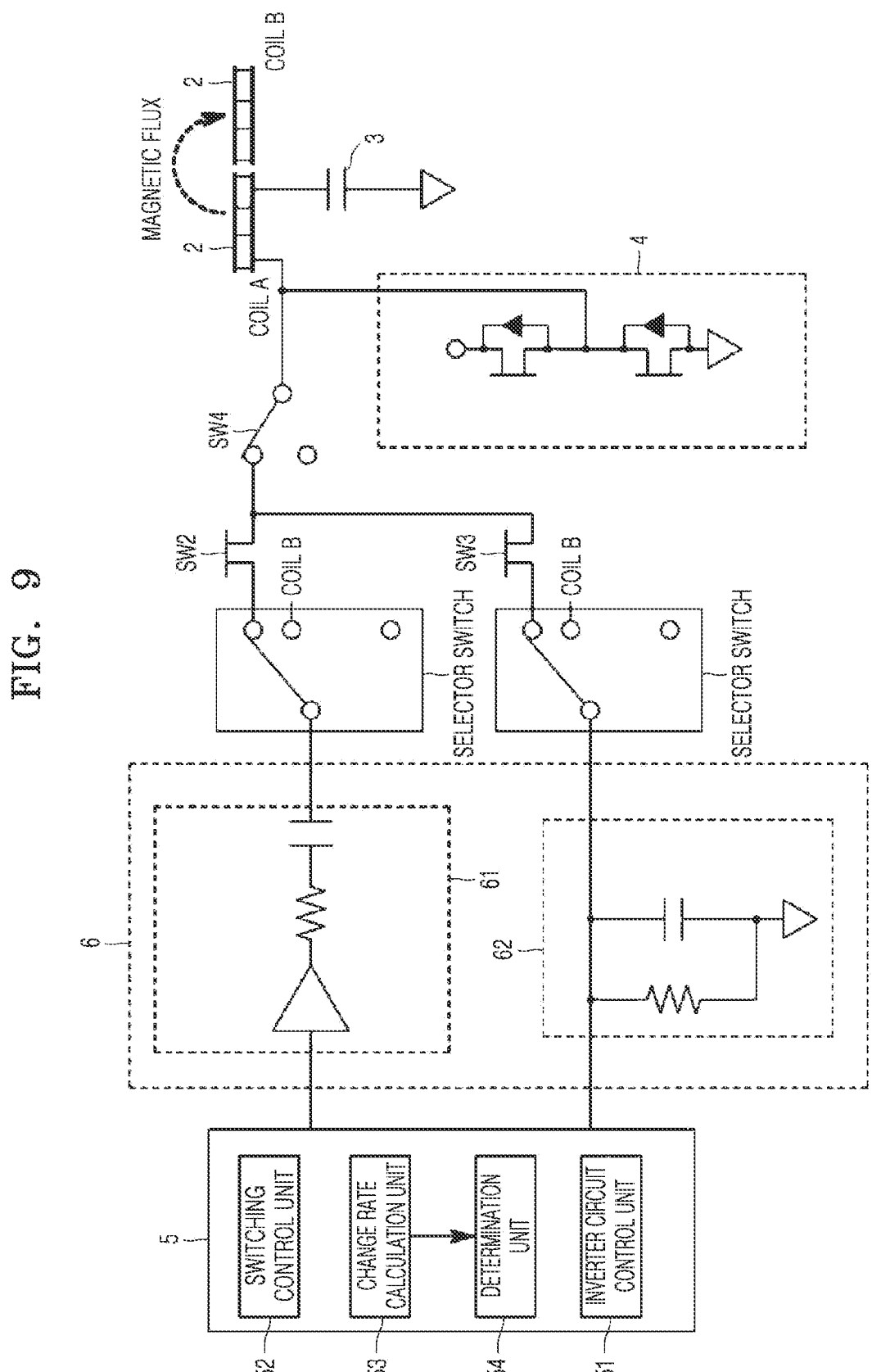
FIG. 9 illustrates a schematic diagram of a circuit configuration of an energy supply device, according to an embodiment of the disclosure.

FIG. 9 illustrates a schematic diagram of a circuit configuration of an energy supply device, according to an embodiment of the disclosure.

Referring to FIGS. 3 and 8, the detection circuit 6 (e.g., the transmission circuit 61 and the reception circuit 62) is individually connected to each coil 2, but the disclosure is not limited thereto. According to an embodiment, as shown in FIG. 9, the energy supply device may be configured such that the transmission circuit 61 and the reception circuit 62 are shared between the plurality of coils 2.

In an embodiment, a coil group including at least one coil from among the plurality of coils 2 may be connected to one transmission circuit 61 to be switchable by a switch. For example, coils included in a first coil group may be switchably connected to the one transmission circuit 61. In an embodiment, a coil group including at least one coil from among the plurality of coils 2 may be connected to one reception circuit 62 to be switchable by a switch. For example, coils included in a second coil group may be switchably connected to the one reception circuit 62. The coils included in the first coil group and the coils included in the second coil group may be the same as, different from, or partially different from each other.

Specifically, the one transmission circuit 61 may be configured to be connected to the plurality of coils 2 included in the first coil group through a selector switch. In an embodiment, the switching control unit 52 of the control device 5 may control the selector switch to switch a plurality of coils included in the first coil group and determine a transmission coil. For example, when a first coil included in the first coil group is determined as a transmission coil, the selector switch is operated according to a control signal so that the first coil may be electrically connected to the transmission circuit 61, and the remaining coils included in the first coil group may be electrically disconnected from the transmission circuit 61.

Likewise, the one reception circuit 62 may be configured to be connected to the plurality of coils 2 included in the second coil group through a selector switch. In an embodiment, the switching control unit 52 of the control device 5 may control the selector switch to switch a plurality of coils included in the second coil group and determine a reception coil. For example, when a second coil included in the second coil group is determined as a reception coil, the selector switch is operated according to a control signal so that the second coil may be electrically connected to the reception circuit 62, and the remaining coils included in the second coil group may be electrically disconnected from the reception circuit 62.

In the case of FIG. 9, because each of the plurality of coils is not individually connected to the detection circuit, the number of detection circuits may be reduced. In other words, the number of components, such as drivers and detection resonant condensers, and peripheral circuits that constitute the energy supply device may be reduced.

Figure 10:
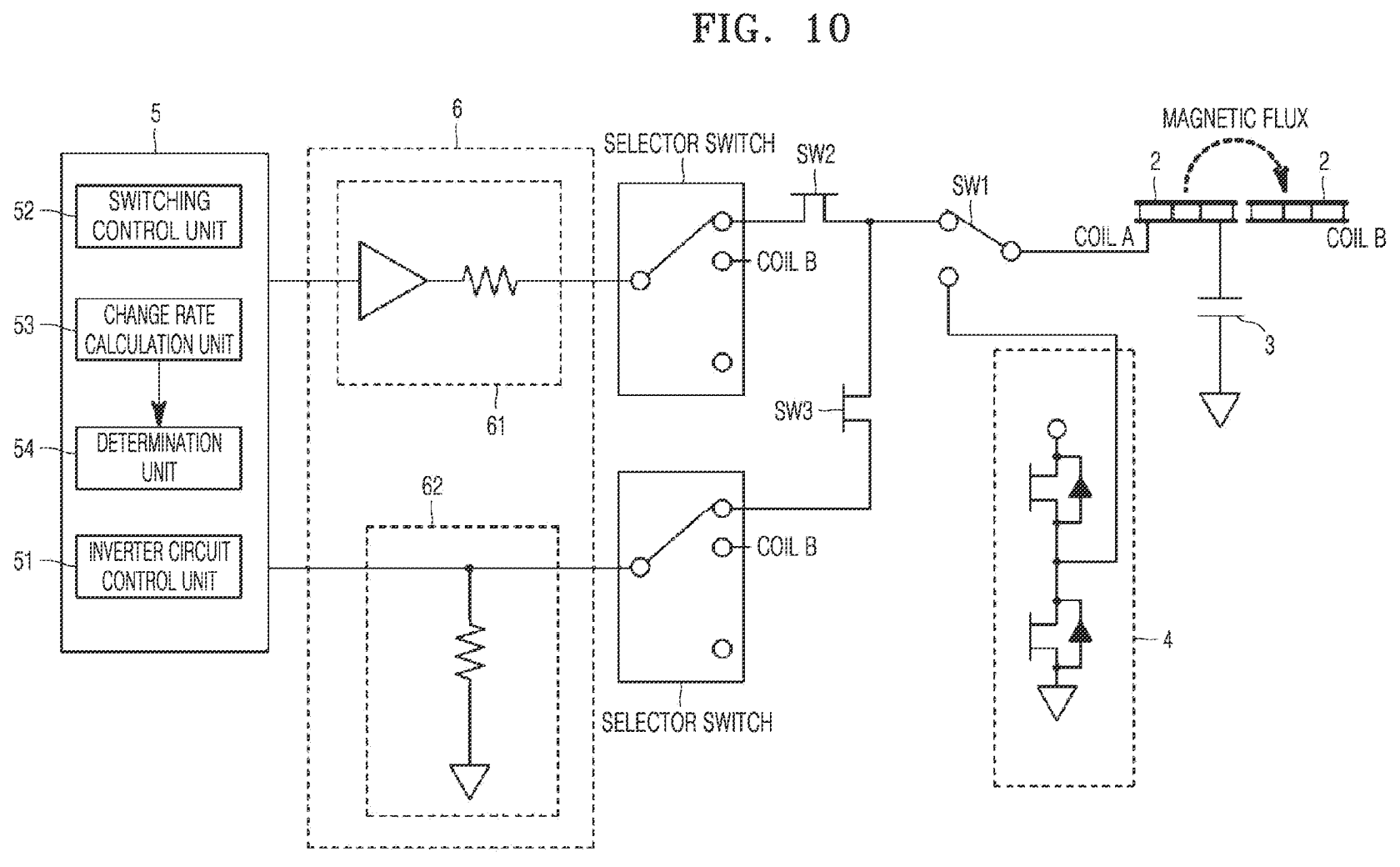

FIG. 10 illustrates a schematic diagram of a circuit configuration of an energy supply device, according to an embodiment of the disclosure.

Referring to FIGS. 3, 8, and 9, each of the transmission circuit 61 and the reception circuit 62 may include resonant condensers 61c and 62b for detection, but is not limited thereto. According to an embodiment, as shown in FIG. 10, at least one of the transmission circuit 61 and the reception circuit 62 may not include a resonant condenser for detection. For example, when the detection circuit 6 and the inverter circuit 4 are switchably connected to the coil 2, at least one of the transmission circuit 61 and the reception circuit 62 may not include a separate resonant condenser for detection. When the inverter circuit 4 may be electrically separated from the coil 2 by the switch SW1, the resonant condenser 3 for energy supply may be shared as a resonant condenser for detecting the object O.

Embodiments according to the circuit configurations shown in FIGS. 3 and 8 to 10 may be applied in combination.

Figure 11:
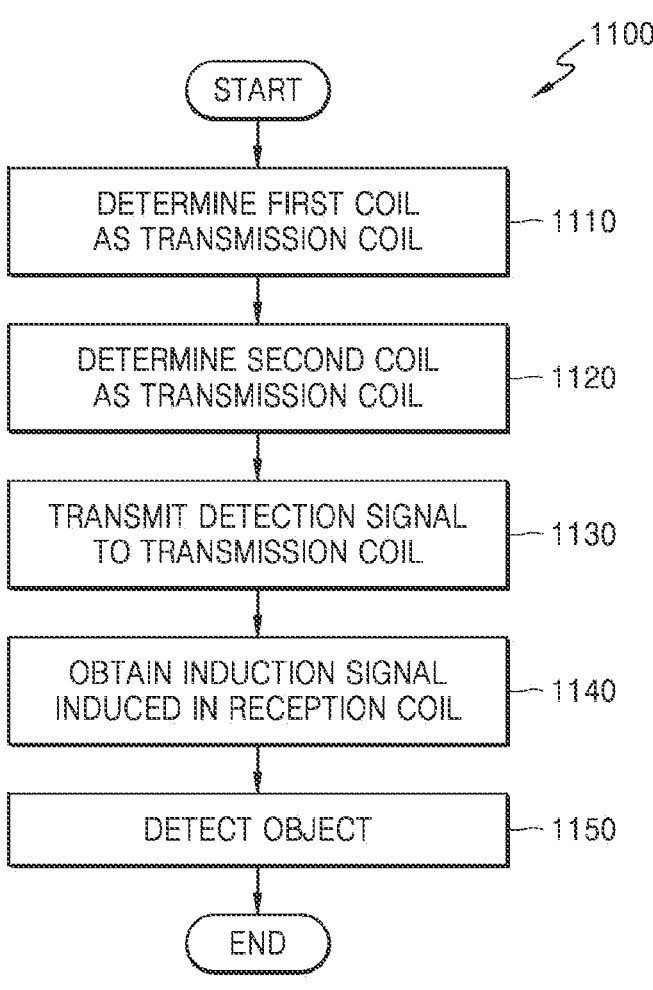
FIG. 11 illustrates a flowchart of a method of detecting an object by an energy supply device, according to an embodiment of the disclosure.

FIG. 11 illustrates a flowchart of a method of detecting an object by an energy supply device, according to an embodiment of the disclosure.

Referring to FIG. 11, a method 1100 of detecting an object by the energy supply device (e.g., the energy supply device in FIG. 1) may include operations 1110 to 1150. The method 1100 of detecting the object by the energy supply device is not limited to that shown in FIG. 11, and any one of the operations shown in FIG. 11 may be omitted, and an operation not shown in FIG. 11 may be further included. For example, the method 1100 may further include an operation of determining each of a plurality of coils as a transmission coil. In addition, the method 1100 may further include an operation of determining each of one or more coils located around a coil, the coil being determined as a transmission coil, as a reception coil.

In operation 1110, by at least processor included in the energy supply device, a first coil from among a plurality of coils may be determined as a transmission coil. In an embodiment, as the first coil is determined as a transmission coil, the at least one processor may control one or more switches (e.g., selector switch) such that a detection signal is output to the first coil. Additionally, the at least one processor may sequentially switch each of the plurality of coils as well as the first coil and determine the coils as a transmission coil, and perform operations described below.

In operation 1120, the at least one processor may determine a second coil from among the plurality of coils as a reception coil. The second coil may be a different coil from the coil determined as the transmission coil. In an embodiment, the at least one processor may determine a coil located around the coil determined as the transmission coil as a reception coil. For example, the at least one processor may determine a coil adjacent to the coil determined as the transmission coil as a reception coil. In an embodiment, as the second coil is determined as a reception coil, the at least one processor may control one or more switches (e.g., selector switch) such that an induction signal induced in the second coil is obtained. Additionally, the at least one processor may sequentially switch one or more coils located around the coil determined as the transmission coil as well as the second coil and determine the coils as reception coils, and perform operations described below.

In operation 1130, the at least one processor may control a detection signal for object detection to be transmitted to the transmission coil. In an embodiment, the at least one processor may control the detection signal to be transmitted to a first coil determined as a transmission coil through a transmission circuit connected to the first coil. To this end, the at least one processor may control one or more switches.

In operation 1140, the at least one processor may control such that an induction signal induced in a reception coil by the detection signal is obtained. In an embodiment, the at least one processor may control such that an induction signal (e.g., induction current or voltage) induced in the second coil determined as a reception coil by the detection signal is received through a reception circuit connected to the second coil. To this end, the at least one processor may control one or more switches.

In operation 1150, the at least one processor may detect an object on the energy supply device based on the obtained induction signal. In an embodiment, the at least one processor may detect an object on the second coil based on induction signal data, that includes an induction signal obtained while the second coil corresponds to the reception coil, and prestored reference data. The induction signal data for the second coil may include one or more pieces of induction signal information obtained while the second coil is determined as a reception coil for an arbitrary transmission coil. Additionally, the at least one processor may detect an object for each of a plurality of coils based on induction signal data, that includes an induction signal obtained while each of the plurality of coils corresponds to the reception coil, and prestored reference data. The at least one processor may detect an object on the energy supply device according to the object detection result for each of the plurality of coils.

FIG. 11 sequentially shows operations of the object detection method 1100 according to an embodiment, but the disclosure is not limited thereto, and each of the operations may be performed in a different order. For example, after the second coil is determined as a reception coil, accordingly, the first coil may be determined as a transmission coil. For example, after a detection signal is transmitted to the first coil, the second coil may be determined as a transmission coil.

A machine-readable storage medium may be provided in a form of a non-transitory storage medium. The term 'non-transitory storage medium' may mean a tangible device without including a signal, e.g., electromagnetic waves, and may not distinguish between storing data in the storage medium semi-permanently and temporarily. For example, the non-transitory storage medium may include a buffer that temporarily stores data.

In an embodiment of the disclosure, the aforementioned method according to the various embodiments of the disclosure may be provided in a computer program product. The computer program product may be a commercial product that may be traded between a seller and a buyer. The computer program product may be distributed in a form of machine-readable storage medium (for example, a compact disc read-only memory (CD-ROM)), or distributed (for example, downloaded or uploaded) through an application store or directly or online between two user devices (for example, smart phones). In the case of online distribution, at least part of the computer program product (e.g., a downloadable app) may be at least temporarily stored or arbitrarily created in a storage medium that may be readable to a device such as a server of the manufacturer, a server of the application store, or a relay server. In addition, modifications or combinations of various embodiments may be made as long as they do not conflict with the spirit of the disclosure.

An energy supply device that supplies energy to an object, according to an embodiment of the disclosure, may include at least one processor, and a plurality of coils connected to a resonant condenser for energy supply and an inverter circuit. In an embodiment, the at least one processor may determine a first coil from among the plurality of coils as a transmission coil. In an embodiment, the at least one processor may determine a second coil from among the plurality of coils as a reception coil. In an embodiment, the at least one processor may control a detection signal to be transmitted to the first coil through a transmission circuit connected to the first coil. In an embodiment, the at least one processor may control an induction signal induced in the second coil by the detection signal to be obtained through a reception circuit connected to the second coil. In an embodiment, the at least one processor may detect the object on the energy supply device based on the obtained induction signal.

According to an embodiment, a transmission coil for transmitting a detection signal by the transmission circuit and a reception coil for detecting voltage or current by the reception coil are selected from among a plurality of coils and configured to be sequentially switched, a plurality of coils arranged below a top plate may be used as a transmission coil or a reception coil. Accordingly, the plurality of coils arranged below the top plate are set in various combinations as a transmission coil and a reception coil, and voltage or current from each reception coil according to the detection signal is detected, so that a type, location, and size of an object placed on the top plate may be detected.

In an embodiment, the at least one processor may sequentially switch the plurality of coils and determine the coils as a transmission coil. In an embodiment, the at least one processor may sequentially switch one or more coils located around a coil determined as the transmission coil and determine the coils as a reception coil. According to an embodiment, a plurality of coils are all set as transmission coils, so that a location and size of the object may be more accurately detected.

In an embodiment, the at least one processor may calculate a change rate for the second coil based on induction signal data for the second coil and prestored reference data. In an embodiment, the at least one processor may detect the object on the second coil based on the change rate for the second coil. In an embodiment, the induction signal data for the second coil may include one or more induction signals obtained through a reception circuit connected to the second coil while the second coil is determined as the reception coil by the at least one processor.

In an embodiment, the at least one processor may determine that an object to be heated is present on the second coil, when the change rate for the second coil is a first threshold or less. In an embodiment, the at least one processor may determine a power supply object is present on the second coil, when the change rate for the second coil is greater than the first threshold and is a second threshold or less. In an embodiment, the at least one processor may determine that a foreign substance is present on the second coil when the change rate for the second coil is greater than the second threshold and is a third threshold or less. In an embodiment, the at least one processor may determine that the object and the foreign substance are not present on the second coil, when the change rate for the second coil is greater than the third threshold.

In an embodiment, the at least one processor may determine at least one of a type, size, and location of the object based on a detection result of the object for each of the plurality of coils.

In an embodiment, the at least one processor may control energy to be supplied to the object through at least some of the plurality of coils based on the determined at least one of the type, size, and location of the object.

In an embodiment, at least one coil of the plurality of coils may be connected to at least one of a transmission circuit and a reception circuit. In an embodiment, the at least one of the transmission circuit and the reception circuit may include a resonant condenser for detection connected in series to the resonant condenser for energy supply.

According to an embodiment, inductance values and capacitance values of the transmission circuit and the reception circuit may be adjusted so that a resonance frequency of an LC series resonant circuit on the transmission circuit side and a resonance frequency of an LC parallel resonant circuit on the reception circuit side may coincide with each other. By having the same configuration as wireless power supply of a resonance type, a variation of voltage or current due to an object (e.g., change in impedance and change in inductance) may be further increased.

In an embodiment, at least one coil from among the plurality of coils may be connected to a detection circuit and the inverter circuit to be switchable by a switch. In an embodiment, the detection circuit may include at least one of the transmission circuit and the reception circuit.

In an embodiment, at least one coil from among the plurality of coils may always be electrically connected to the inverter circuit. In an embodiment, a coil group including the at least one coil may be switchably connected to one transmission circuit by a switch. In an embodiment, the coil group including the at least one coil may be switchably connected to one reception circuit by a switch.

In an embodiment, a frequency of alternating current voltage supplied from the inverter circuit to at least one coil from among the plurality of coils and a frequency of the detection signal may be different from each other. In an embodiment, the frequency of the detection signal may be higher than the frequency of the alternating current voltage by 10% or more, or may be lower than the frequency of the alternating current voltage by 10% or more.

According to an embodiment, even when a power supply operation or heating operation is performed by using some coils, an energy supply device may detect a type, location, and size of an object placed on another coil.

A method of detecting an object by an energy supply device, according to an embodiment of the disclosure, may include determining, by at least one processor included in the energy supply device, a first coil from among the plurality of coils as a transmission coil. In an embodiment, the method may include determining, by the at least one processor, a second coil from among the plurality of coils as a reception coil. In an embodiment, the method may include controlling, by the at least one processor, a detection signal to be transmitted to the first coil through a transmission circuit connected to the first coil. In an embodiment, the method may include controlling, by the at least one processor, an induction signal induced in the second coil by the detection signal to be obtained through a reception circuit connected to the second coil. In an embodiment, the method may include detecting the object based on the obtained induction signal by the at least one processor.

In an embodiment, a plurality of coils may be sequentially switched and determined as a transmission coil by the at least one processor. In an embodiment, one or more coils located around a coil determined as a transmission coil may be sequentially switched and determined as a reception coil by the at least one processor.

In an embodiment, the method may include calculating, by the at least one processor, a change rate for the second coil based on induction signal data for the second coil and prestored reference data. In an embodiment, the method may include detecting, by the at least one processor, the object on the second coil based on the change rate for the second coil.

In an embodiment, the method may include, when the change rate for the second coil is a first threshold or less, determining, by the at least one processor, that an object to be heated is present on the second coil. In an embodiment, the method may include, when the change rate for the second coil is greater than the first threshold and is a second threshold or less, determining, by the at least one processor, that a power supply object is present on the second coil. In an embodiment, the method may include, when the change rate for the second coil is greater than the second threshold and is a third threshold or less, determining, by the at least one processor, that a foreign substance is present on the second coil. In an embodiment, the method may include, when the change rate for the second coil is greater than the third threshold, determining, by the at least one processor, that the object and a foreign substance are not present on the second coil.

In an embodiment, the method may include determining, by the at least one processor, at least one of a type, size, and location of the object based on a detection result of the object for each of the plurality of coils. In an embodiment, the method may include controlling, by the at least one processor, energy to be supplied to the object through at least some of the plurality of coils based on the determined at least one of the type, size, and location of the object.

A program for performing, on a computer, a method of detecting an object by an energy supply device, according to an embodiment of the disclosure, may be recorded on a computer-readable recording medium.

Although the present disclosure has been described with various embodiments, various changes and modifications may be suggested to one skilled in the art. It is intended that the present disclosure encompass such changes and modifications as fall within the scope of the appended claims.

What is claimed is:

1. An energy supply device comprising:
   at least one processor; and
   a plurality of coils connected to a resonant condenser for supplying energy and an inverter circuit, and
   wherein the at least one processor is configured to:
      determine, among the plurality of coils, a first coil as a transmission coil;
      determine, among the plurality of coils, a second coil as a reception coil;
      transmit a detection signal to the first coil through a transmission circuit connected to the first coil;
      obtain an induction signal induced in the second coil by the detection signal through a reception circuit connected to the second coil;
      calculate a change rate for the second coil based on induction signal data for the second coil and reference data; and
      detect an object on the energy supply device based on the change rate for the second coil and at least one threshold.

2. The energy supply device of claim 1, wherein the at least one processor is further configured to sequentially switch the plurality of coils and determine each of the plurality of coils as the transmission coil.

3. The energy supply device of claim 1, wherein the at least one processor is further configured to sequentially switch one or more coils located around the first coil determined as the transmission coil and determine each of the one or more coils as the reception coil.

4. The energy supply device of claim 1,
   wherein the induction signal data for the second coil comprises one or more induction signals obtained through the reception circuit connected to the second coil while the second coil is determined as the reception coil.

5. The energy supply device of claim 1, wherein the at least one processor is further configured to:
   when the change rate for the second coil is less than or equal to a first threshold, determine that an object to be heated is present on the second coil;
   when the change rate for the second coil is greater than the first threshold and is less than or equal to a second threshold, determine that a power supply object is present on the second coil;
   when the change rate for the second coil is greater than the second threshold and is less than or equal to a third threshold, determine that a foreign substance is present on the second coil; and
   when the change rate for the second coil is greater than the third threshold, determine that the object to be heated, the power supply object, and the foreign substance are not present on the second coil.

6. The energy supply device of claim 1, wherein the at least one processor is further configured to determine at least one of a type, a size, or a location of the object based on a detection result of the object for each of the plurality of coils.

7. The energy supply device of claim 6, wherein the at least one processor is further configured to supply the energy to the object through at least some of the plurality of coils based on the at least one of the type, the size, or the location of the object.

8. The energy supply device of claim 1, wherein at least one coil among the plurality of coils is connected to at least one of the transmission circuit or the reception circuit, and
   wherein the at least one of the transmission circuit or the reception circuit comprises a resonant condenser for detection connected in series to the resonant condenser for supplying the energy.

9. The energy supply device of claim 1, wherein a detection circuit and the inverter circuit are switchably connected, by a switch, to at least one coil among the plurality of coils by a switch, and
   wherein the detection circuit comprises at least one of the transmission circuit or the reception circuit.

10. The energy supply device of claim 1, wherein at least one coil among the plurality of coils is always electrically connected to the inverter circuit.

11. The energy supply device of claim 1, wherein coils included in a coil group are switchably connected, by a switch, to one transmission circuit.

12. The energy supply device of claim 1, wherein coils included in a coil group are switchably connected, by a switch, to one reception circuit.

13. The energy supply device of claim 1, wherein a frequency of alternating current voltage supplied from the inverter circuit to at least one coil among the plurality of coils is different from a frequency of the detection signal.

14. The energy supply device of claim 13, wherein the frequency of the detection signal is higher than the frequency of the alternating current voltage by 10% or more, or is lower than the frequency of the alternating current voltage by 10% or more.

15. A method of an energy supply device, the method comprising:
   determining, among a plurality of coils, a first coil as a transmission coil;
   determining, among the plurality of coils, a second coil as a reception coil;

transmitting a detection signal to the first coil through a transmission circuit connected to the first coil;

obtaining an induction signal induced in the second coil by the detection signal through a reception circuit connected to the second coil;

calculating a change rate for the second coil based on induction signal data for the second coil and reference data; and detecting an object on the energy supply device based on the change rate for the second coil and at least one threshold.

16. The method of claim 15, further comprising:

sequentially switching the plurality of coils; and determining each of the plurality of coils as the transmission coil.

17. The method of claim 15, further comprising:

sequentially switching one or more coils located around the first coil determined as the transmission coil; and determining each of the one or more coils as the reception coil.

18. The method of claim 15, wherein the induction signal data for the second coil comprises one or more induction signals obtained through the reception circuit connected to the second coil while the second coil is determined as the reception coil.

19. The method of claim 15, wherein the detecting of the object on the energy supply device comprises:

when the change rate for the second coil is less than or equal to a first threshold, determining that an object to be heated is present on the second coil;

when the change rate for the second coil is greater than the first threshold and is less than or equal to a second threshold, determining that a power supply object is present on the second coil;

when the change rate for the second coil is greater than the second threshold and is less than or equal to a third threshold, determining that a foreign substance is present on the second coil; and when the change rate for the second coil is greater than the third threshold, determining that the object to be heated, the power supply object, and the foreign substance are not present on the second coil.

20. The method of claim 15, further comprising determining at least one of a type, a size, or a location of the object based on a detection result of the object for each of the plurality of coils.

* * * * *